United States Patent [19]

Thomey et al.

[11] Patent Number: 4,473,362
[45] Date of Patent: Sep. 25, 1984

[54] BELT TENSIONER WITH VARIABLY PROPORTIONAL DAMPING

[75] Inventors: Henry W. Thomey, Keswick; Klaus K. Bytzek; Johannes H. Mevissen, both of Schomberg, all of Canada

[73] Assignee: Litens Automotive Inc., Ontario, Canada

[21] Appl. No.: 281,501

[22] Filed: Jul. 8, 1981

[51] Int. Cl.³ .............................................. F16H 7/12
[52] U.S. Cl. .................................... 474/135; 474/133; 474/115; 267/136
[58] Field of Search ............... 474/115, 133, 135, 136, 474/138; 188/379; 267/134, 136, 152; 74/461

[56] References Cited

U.S. PATENT DOCUMENTS

| 1,667,117 | 4/1928 | Ireland | 474/132 |
| 2,235,972 | 3/1941 | Zimmerman | 474/115 |
| 3,057,218 | 10/1962 | Knerr et al. | 474/115 |
| 3,080,159 | 3/1963 | Orner | 267/152 |
| 3,834,246 | 9/1974 | McGilp | 474/135 |
| 3,975,965 | 8/1976 | Speer | 474/135 |
| 3,990,324 | 11/1976 | Fishbaugh et al. | 188/379 |
| 4,144,772 | 3/1979 | Brackin et al. | 474/135 |

OTHER PUBLICATIONS

SAE Technical Paper Series, No. 790699, Jun. 15, 1979, R. L. Cassidy, S. K. Fan, R. S. MacDonald, W. F. Samson, "Serpentine-Extended Life Accessory Drive".

Primary Examiner—Leslie A. Braun
Assistant Examiner—Joseph M. Rolnicki
Attorney, Agent, or Firm—Cushman, Darby & Cushman

[57] ABSTRACT

In a belt tensioning device of the type including a fixed structure, a pivoted structure mounted with respect to the fixed structure for pivotal movement about a first axis between first and second limiting positions, a belt engaging pulley rotatably carried by the pivoted structure for rotational movement about a second axis parallel with the first axis and a torsional coil spring acting between the fixed and pivoted structures for resiliently biasing the pivoted structure to move in a direction away from the first limiting position toward the second limiting position with a spring force which decreases as the pivoted structure is moved in a direction away from the first position toward the second position. The device is provided either with an elastomeric damping body for (1) damping by elastomeric material displacement normal low amplitude operating movements of the pivoted structure and (2) damping sequentially by high friction surface sliding abnormal high amplitude movements of the pivoted structure beyond those which are damped by the elastomeric material displacement with a damping force which decreases as the pivoted structure is moved in a direction away from the first position toward the second position or a Zytel damping body for damping by friction surface sliding substantially all movements of said pivoted structure with a damping force which decreases as the pivoted structure is moved in a direction away from the first position toward the second position.

20 Claims, 6 Drawing Figures

BELT TENSIONER WITH VARIABLY PROPORTIONAL DAMPING

This invention relates to belt drive systems and more particularly to improvements in belt tensioners utilized in belt drive systems.

It has been common practice for many years in the automotive industry to utilize multiple individual V-belt drives for the various rotary instrumentalities driven by the engine. Such a system required the utilization of a pulley on the engine output shaft suitable to separately receive two, three, four or more V-belts. Each separate V-belt was then mounted and adjusted to drive a single rotary instrumentality (or two or more in some instances) by virtue of the adjustable mount of the instrumentality.

In recent years it has been found desirable to replace the conventional multiple individual belt system with a system embodying a single belt arranged in serpentine fashion to drive all of the multiple rotary instrumentalities heretofore driven by separate belts. Some of the single serpentine belt systems thusfar utilized have included a separate belt tensioning device both as an essential to the proper functioning of the system and as a means to simplify the mounting of each rotary instrumentality (i.e. eliminating the need for an adjustable mount) and the mounting and tensioning of the belt in operative relation therewith.

Belt tensioners are, of course, well-known devices and have been utilized in many belt systems heretofore. However, the requirements placed upon belt tensioners utilized in serpentine single belt automotive systems are particularly stringent. These particularly stringent requirements stem from a combination of factors including the relatively greater belt length utilized and hence the relatively greater belt take-up capacity required. In addition, these increased takeup capacities must be effectively operated over an extensive period of use in which excessive vibrational loads are imposed.

The damping requirements are essential in order to enable the system to function over an extended period on a pulsating machine without creating resonance. Where an air conditioning compressor constitutes one of the rotary instrumentalities of the system, a particularly troublesome pulsating load is imposed upon the system as the compressor operates and cuts in and out of operation.

It is conventional practice in the belt tensioner art to provide for the application of a constant belt tensioning force which compensates for increases in belt length due to wear and other factors.

A common type of conventional belt tensioner embodies a fixed structure and a pivoted structure in the form of an arm carrying a belt engaging pulley pivoted to the fixed structure by a pivot assembly. A coil spring is mounted in surrounding relation to the pivot assembly and has its ends connected between the fixed and pivoted structures so as to bias the latter toward a position of maximum take-up so that the spring biasing force decreases as the pivoted structure moves from a position of minimum take-up to a position of maximum take-up. Despite this varying spring force within the range of movement provided a substantially constant belt tension is maintained. An understanding of the constant belt tensioning provided can be obtained by first assuming that the idler pulley is frictionless and that the tension of the belt spans on either side of the idler pulley is equal. The pivot assembly hub load acts through the bisector of the angle of wrap. The belt tension is a function of the angle of wrap and the hub load. Since belt tension becomes increasingly more sensitive to hub load as the angle of wrap is reduced, it is preferable to provide a system in which the minimum angle of wrap is at least 45° and a minimum of 60° is considered better practice.

The moment arm of the belt tensioner is the perpendicular distance from the bisector of the angle of wrap to the pivotal axis of the arm. As the arm is moved through its stroke during belt installation the torque output or spring force of the spring increases and simultaneously the moment arm length increases. After installation and increased belt take-up is required, the spring force and moment arm simultaneously decrease as the amount of take-up increases. These two characteristics, spring force and moment arm, act counter to one another and permit the hub load to stay relatively constant.

The idler arm angle is defined as the angle between the arm centerline (or the line common to the arm pivotal axis and the pulley rotary axis) and the bisector of the angle of wrap. This angle preferably should be no less than 15° at the maximum take-up position and, preferably, should not exceed 45° at the position of minimum take-up. Of course, extra travel must be provided in order to install the belt. Total arm travel preferably should not exceed 75° and it is considered better practice to keep it within 65°.

As previously stated, the vibrational environment of an automobile belt system is particularly harsh and the amount of damping required to eliminate harmonic spring vibration is usually only a portion of the total requirement particularly, where air conditioning compressors are present, as aforesaid. It has been proposed to utilize solid elastomeric bodies to provide the spring force (e.g. U.S. Pat. Nos. 3,975,965 and No. 4,144,722) with the resultant utilization of the greater amount of damping inherently provided by such springs, as compared with steel springs. While tensioners embodying springs of elastomeric material obviate the excessive wear problems hereinafter noted, there are other problems and limitations presented. One limitation is that the amount of damping provided must be inherently built into the elastomeric spring body and cannot be separately varied to suit the circumstances. Springs of a rigid material, such as metallic coil springs and the like, can readily accommodate an extensive angular movement at a relatively uniform spring rate. Another limitation of elastomeric springs is that these conditions cannot always be duplicated due to the inherent characteristics with respect to the amount of displacement which can be accommodated. This limitation is particularly troublesome in applications such as the severe automotive applications herein contemplated which require an extensive angular takeup movement with a fairly high spring rate throughout the total angular travel. The characteristic of a spring made of elastomeric material is that the spring rate is not uniform but increases quite rapidly as the displacement of the elastomeric material reaches its maximum displacement due to the angular movement. Moreover, the spring rates are adversely affected more readily by temperature conditions within the range which may be present under the hood of an automobile. Furthermore, springs made of elastomeric material tend to take an operational set which can significantly vary their operational characteristics. In general, it can be stated that tensioners embodying springs of elastomeric material have a propensity to need initial and periodic calibration and adjustment. For all of the reasons set forth above the provision of tensioners having springs of elastomeric material has not been commercially adopted on a wide scale basis, if at all.

The tensioner selected for initial commercial use is disclosed in SAE paper No. 790699 dated June 11-15, 1979 entitled "Serpentine—Extended Life Accessory Drive" by Cassidy et al. It is a steel torsional spring type tensioner embodying twin coils. Separate constant damping is provided by incorporating an elastomeric sleeve in the pivot assembly. The pivot assembly provided includes an inner shaft forming a part of the fixed or stationary structure and a sleeve forming a part of the pivoted structure. The exterior diameter size of the shaft is considerably smaller than the interior diameter size of the sleeve so that when the two are assembled in concentric axially coextensive relation there is defined an annular space therebetween. The opposite end portions of the annular space are filled with a pair of axially spaced nylon sleeve bearings. The elastomeric damping sleeve is positioned to fill the central portion of the annular space between the nylon sleeve bearings. The damping provided by the arrangement is constant by virtue of the presence of the bearings which retain the shaft and arm sleeve in the same spaced relationship irrespective of the pivotal position of the arm and/or the magnitude of the spring force imposed thereon by the torsional coil springs provided. While the arrangement was preferable to a tensioner utilizing an elastomeric spring, the wear to which the elastomeric damping sleeve is subject during operation by virtue of its high friction characteristics and its sliding contact with the arm sleeve caused a rapid deterioration in its damping characteristics. That is, since the annular space within which the damping sleeve is mounted is maintained substantially constant by the sleeve bearings on each side thereof and the damping characteristics are determined by the exterior dimension of the damping sleeve, operative wear to the damping sleeve reduced its exterior dimension and hence its damping effect.

It is an object of the present invention to provide a belt tensioning device which will obviate the problems noted above and effectively function under the severe conditions presented in the aforesaid automobile application throughout a substantial period of use. In accordance with the principles of the present invention this objective is obtained by providing at least a major part of the damping of the device by means of a separate damping body whose damping characteristics are not constant but vary proportionately with the position of the pivoted structure with respect to the fixed structure in a manner similar to the spring force. The variably proportional damping characteristic provided in accordance with the principles of the present invention as indicated above achieves effective long term operation where extensive take-up movements are encountered. In contrast, where such variably proportional damping is not provided one of two extreme situations may be presented, depending upon the amount of constant damping provided. First, where the amount of constant damping provided is not enough, resonance may be allowed. Second, where the amount of constant damping is increased to prevent resonance, pulley hang-up may occur after a period of operation.

Moreover, not only are these extreme conditions avoided with the present invention but it becomes possible simply by effectively utilizing different materials with which to form the damping member that effective long term operation can be achieved in a large variety of different systems presenting different operative damping requirements. For example, where the normal operating characteristics of the system are such that a relatively high amount of damping is required and the vibrational amplitudes encountered are relatively low, it is desirable to form the damping body of an elastomeric material (e.g. elastomeric urethane). Such a material presents a relatively high amount of surface friction, a characteristic which usually goes with a relatively high wear rate under a surface sliding load. On the other hand, an elastomeric material may provide a correspondingly high degree of internal deformation with an attendant high degree of solid damping. These characteristics combine to achieve sequential damping actions which are desirable in a system having high frequency - low amplitude vibrational characteristics. That is, so long as the amplitudes of the vibrations are small, the only movement which takes place with respect to the damping body is an internal material displacement rather than a surface-to-surface sliding movement. Any high amplitude movements are nevertheless damped by sliding friction of the damping body because they exceed the amount of movement which can be accommodated by internal displacement and the threshold force required to overcome the high surface friction of the elastomeric material. Consequently, where the system requires a high amount of damping of low amplitude vibrations the sequential damping actions provided by an elastomeric material are preferred since wear does not take place when damping is being accomplished by internal displacement. Significantly, however, it should be noted that the threshold value at which sliding friction damping comes into play varies proportionally just as does the damping provided by the sliding friction.

Where the system does not require a large amount of damping but nevertheless presents the need to dampen high amplitudes, it is preferable to utilize a relatively high-wear and low-friction material such as Zytel, since substantially all of the damping requirements can be met by sliding friction (solid damping, if any, being relatively insignificant). Where a system presents both high frequency and high amplitude conditions, effective long term operation cannot be expected to be maintained to the same extent as in the circumstances first mentioned. Here, a predominantly sliding friction damping action (as with Zytel) is preferred since sequential solid damping-sliding friction damping (as with elastomeric polyurethane) results in more rapid wear which is aggravated by excess heat conditions.

Another object of the present invention is the provision of a belt tensioner of the type described which is simple in construction, effective in operation and economical to manufacture.

These and other objects of the present invention will become more apparent during the course of the following detailed description and appended claims.

The invention may best be understood with reference to the accompanying drawings, wherein an illustrative embodiment is shown.

Figure 1:
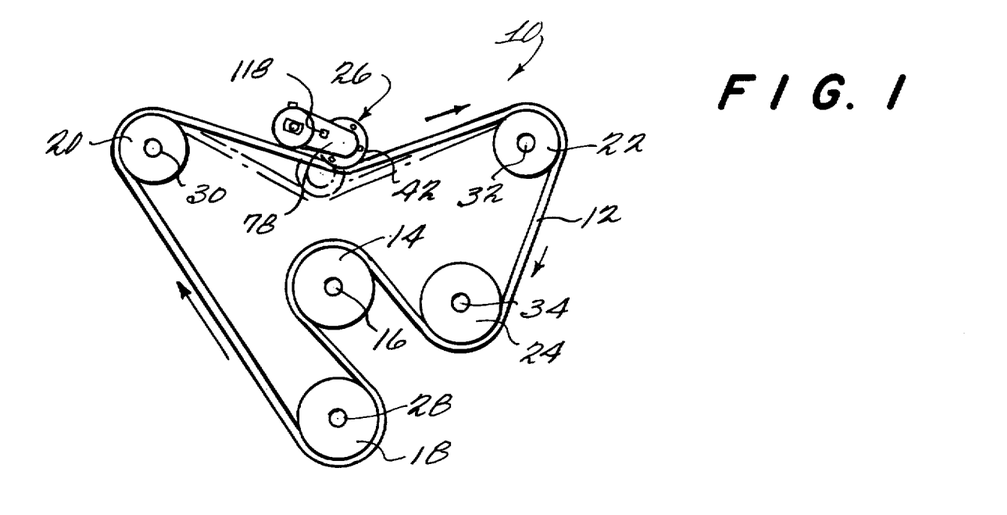
FIG. 1 is a front elevational view of an automotive serpentine belt system embodying a belt tensioner constructed in accordance with the principles of the present invention.
Figure 2:
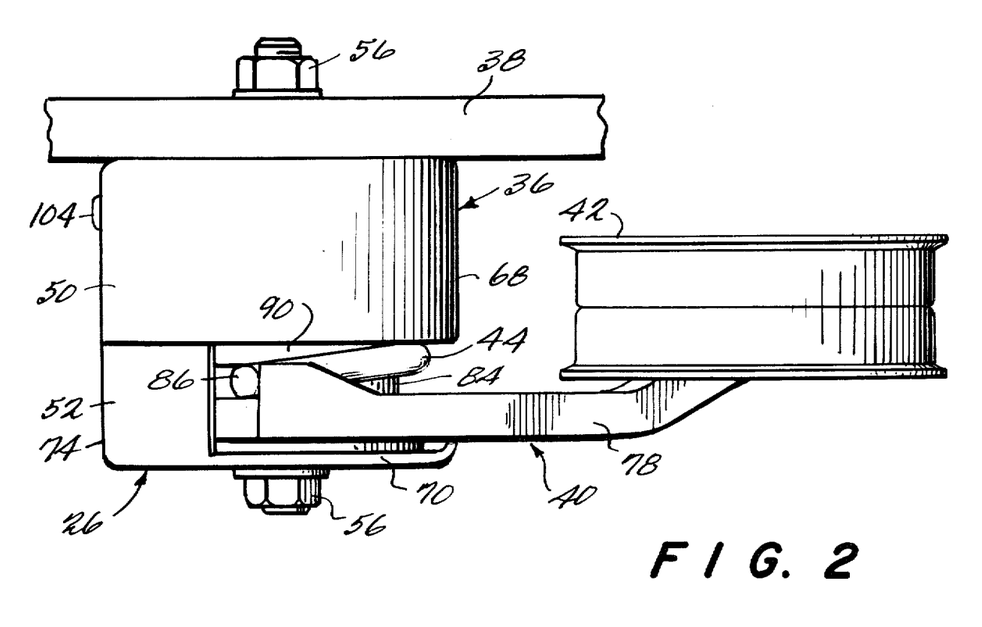
FIG. 2 is an enlarged top plan view of the belt tensioner of the present invention.

Referring now more particularly to the drawings there is shown in FIG. 1 thereof an automotive serpentine belt system, generally indicated at 10, which includes a relatively large endless poly-v belt 12, a drive pulley 14 connected to the output shaft 16 of the automobile engine, four driven pulleys 18, 20, 22 and 24 and a belt tightener generally indicated at 26 which embodies the principles of the present invention. The system 10 as shown is exemplary of the type of system described in the above identified ASE paper, the disclosure of which is hereby incorporated by reference into the present specification for background purposes. In the arrangement shown, driven pulley 18 may be operatively connected with a shaft 28 for a cooling fan, driven pully 20 may be mounted on a shaft 32 which forms a part of an alternator or the like, and driven pulley 24 is mounted on a shaft 34 which forms a part of an air conditioning compressor. It will be understood that the belt 12 is trained about the various pulleys in the manner indicated in the drawings and the belt tensioner 26 is mounted in operative relation with the belt so as to be capable of moving into a position enabling the belt to be mounted on the other instrumentalities and then released to provide a desired tension to the belt in normal operative condition. The belt tensioner 26 also provides for the application of a substantially constant tension to the belt 12 of the system 10 over an extended period of time during which the belt tends to become longer. For example, the solid line position of the belt tensioner illustrates the initial condition of the belt with the belt tensioner 26 in a minimum belt take-up position, whereas the dotted line position illustrates a maximum belt take-up position which may occur after extended use and the belt has been elongated.

Referring now more particularly to FIGS. 2-6 of the drawings, the belt tensioner 26 of the present invention includes a fixed structure 36 which is adapted to be secured to a bracket plate 38 or the like in a stationary position with respect to the engine block. The belt tensioner also includes a pivoted structure 40 which is mounted with respect to the fixed structure 36 for a pivotal movement about a fixed axis between the first and second limiting positions. The pivoted structure 40 carries a belt engaging pulley 42 for rotational movement about a second axis parallel with the first axis. A coil spring 44 is mounted between the fixed structure 36 and pivoted structure 40 for resiliently biasing the latter to move in a direction away from the first limiting position thereof toward the second limiting position with a spring force which decreases as the pivoted structure is moved in a direction away from the first position toward the second position. The second position of the belt tensioner 26 corresponds generally with the dotted line position shown in FIG. 1.

In accordance with the principles of the present invention, the belt tensioner 26 also includes a damping mechanism, generally indicated at 46, which serves in operation to provide damping by a damping force which decreases as the pivoted structure 40 is moved in a direction away from its first position toward the second position thereof.

Figures 3, 6:
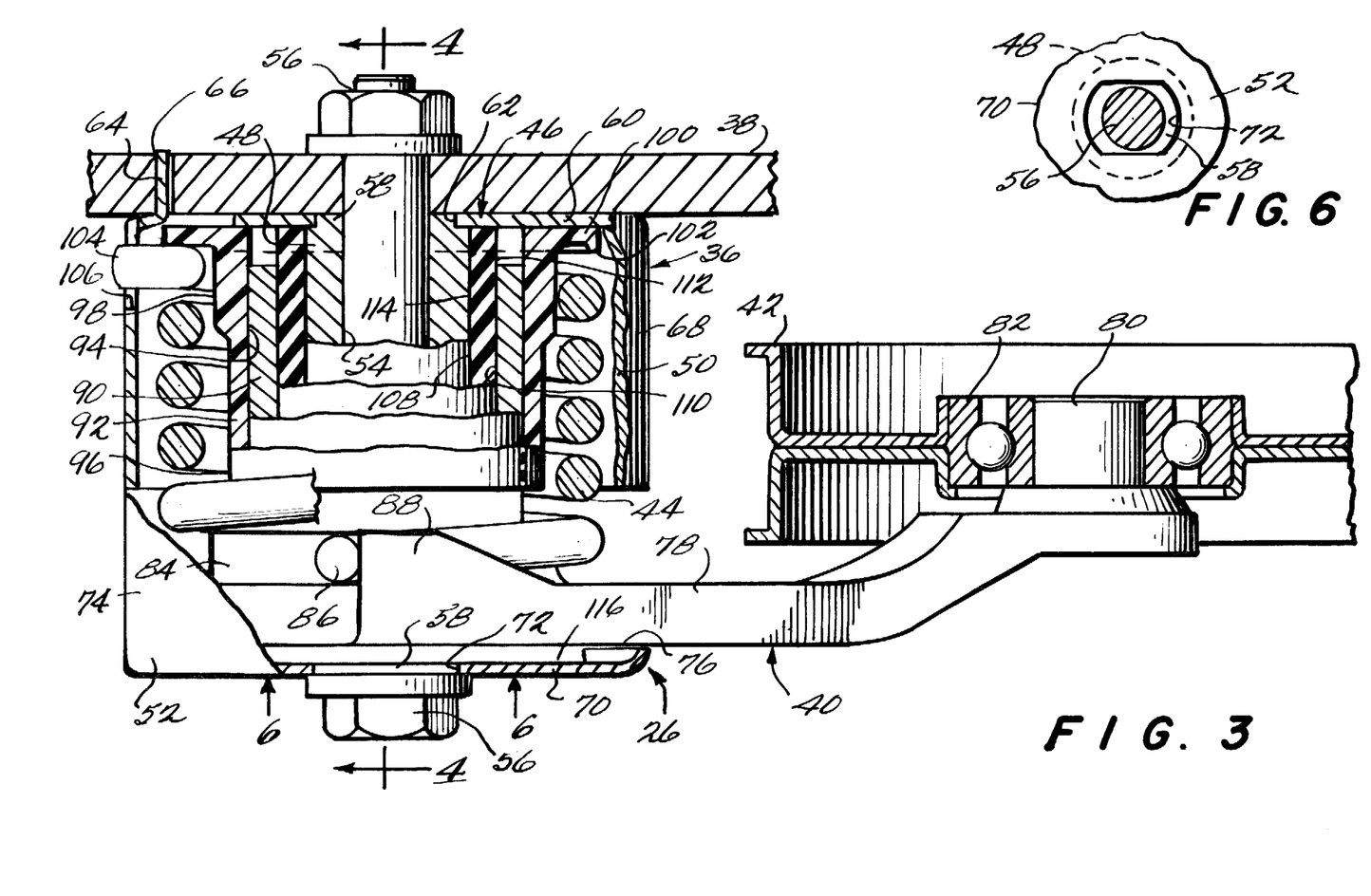
FIG. 3 is an enlarged top plan view with parts broken away for purposes of clearer illustration of the belt tensioner of the present invention.
FIG. 6 is a fragmentary sectional view taken along the line 6—6 of FIG. 3.

The fixed structure 36 may assume a variety of different configurations; however, as shown, it is made up of a rigid core member 48 and a pair of housing shell parts 50 and 52. Core member 48 is generally cylindrical in shape and has a central opening 54 extending longitudinally therethrough for receiving a bolt assembly 56 which serves to detachably secure the fixed structure 36 to the bracket 38. As best shown in FIG. 6, each end of the core member 48 includes a reduced portion 58 formed with peripheral parallel flat surfaces. Housing shell part 50 includes a circular end wall 60 having a central opening 62 shaped to receive the associated end portion 58 of the core member 48. The end wall 60 has a tab 64 struck therefrom and bent outwardly for engaging within an opening 66 formed within the bracket 38 so as to prevent the fixed structure 36 from moving with respect to the bracket about the axis of the bolt assembly 56 and core member 48.

The shell part 50 also includes a cylindrical peripheral wall 68 extending axially from the periphery of the end wall 60 to an extent considerably less than the axial extent of the core member 48. The other housing shell part 52 includes a generally circular end wall 70 having a central opening 72 similar to the opening 62 shaped to engage the other core member end portion 58. The housing shell part 52 includes a segmental peripheral wall 74 which extends from the periphery of the end wall 70 into abutting relation with a segmental portion of the peripheral wall 68 of the housing shell part 50. The parts 50 and 52 thus provide a housing which is closed peripherally except for an angular opening 76 through which an arm portion 78 of the pivoted structure 40 extends.

As best shown in FIG. 3, the free end of the arm portion 78 of the pivoted structure 40 has an integral stub shaft 80 formed thereon on which the pulley 42 is journaled, as by a ball bearing 82 or the like. The opposite end of the arm which extends through the opening 76 into the housing is of enlarged circular configuration and has an annular boss 84 extending axially therefrom of an exterior diameter size sufficient to extend within the interior of the coil spring 44 on one side thereof. As best shown in FIGS. 2-5, one end volute of the coil spring 44 extends around the annular boss 84 and has its extremity bent generally radially outwardly, as indicated at 86, so as to engage an overhanging stop portion 88 formed integrally with the adjacent periphery of the arm portion 78.

The pivoted structure 40 also includes a cylindrical mounting sleeve portion 90 which is integral with the annular boss portion 84 and extends axially outwardly therefrom. The exterior diameter size of the cylindrical mounting portion 90 is less than the exterior diameter size of the annular boss 84 and the interior diameter size of the cylindrical core member 48. As shown, the axial size of the cylindrical mounting portion 90 is such as to extend almost to the circular end wall 60 of the housing part 50.

Mounted in sliding relation with the exterior periphery of the cylindrical mounting portion 90 is a spring bearing member, generally indicated at 92. Preferably the bearing member is molded of a plastic material, a preferred plastic being Zytel ®. The bearing member 92 is formed with a cylindrical interior peripheral surface 94 of a size to engage the exterior peripheral surface of the cylindrical mounting portion 90. The inner end portion of the bearing member 92 is formed with an exterior peripheral surface 96 of a size substantially smaller than the interior of the spring 44. The opposite outer end portion is formed with an exterior peripheral surface 98 of a slightly greater size. An annular flange 100 extends radially outwardly from the outer extremity of the bearing member 92 and is disposed in engagement with the inner surface of the circular end wall 60 of the housing 50. Flange 100 is formed at its outer periphery with an axially inwardly extending rib 102.

Figure 4:
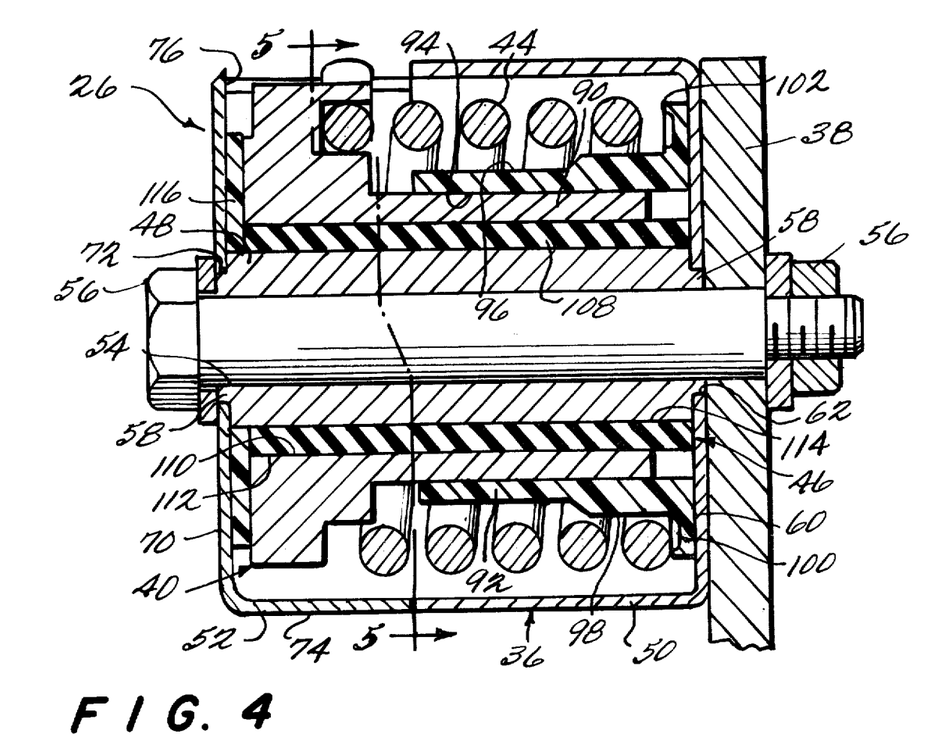
FIG. 4 is a fragmentary sectional view taken along the line 4—4 of FIG. 3.
Figure 5:
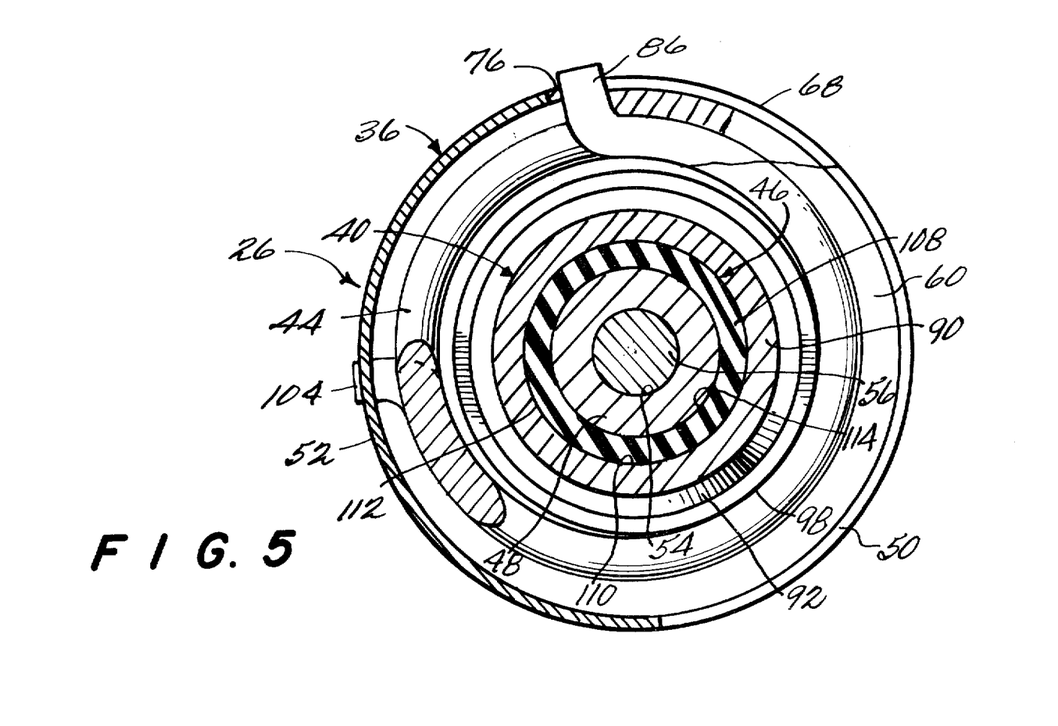
FIG. 5 is an enlarged cross-sectional view taken along the line 5—5 of FIG. 4.

The spring 44 has its opposite end bent radially outwardly as indicated at 104 in a manner similar to the radially outwardly bent end 86. The outwardly bent end 104 of the spring is adapted to engage within a slot 106 formed in the peripheral wall 68 of the housing part 50. As best shown in FIG. 3, the slot 106 preferably extends at an angle of approximately 45° with respect to a radial plane. The slot thus enables the end of the spring 104 to be initially mounted therein at the axially inner end thereof so that the stressing of the spring during assembly, which tends to move the end portion 104 to the right as shown in FIG. 4, also tends to move the same axially outwardly into engagement with the rib 102. As shown in FIG. 3, the engagement of the spring end portion 104 with the rib serves to depress or deform the rib and in this way to positively lock the bearing member 92 against rotation with respect to the fixed structure. However, the arrangement does not positively prevent sliding movement of the bearing member 92 in a direction transverse to the axis of rotation.

The damping mechanism 46 is in the form of a sleeve body 108 of a material chosen in accordance with the principles of the present invention to suit the vibrational characteristics of the system within which the belt tensioner 26 is used. Where the system provides high frequency low amplitude vibrations it is preferable to utilize an elastomeric material as, for example, elastomeric urethane, such as Type II Black urethane. While the durometer of the urethane may vary, an exemplary durometer is 90. Where an elastomeric material is utilized, the operation of the damping sleeve body 108 is such as to provide two different sequential damping actions: first, a solid damping action or internal material displacement damping action; and second, a sliding friction damping action. The two types of damping actions take place sequentially in that solid damping only occurs where the amplitude of the vibration is below a threshold amplitude, while sliding friction damping will occur only after the threshold amplitude has been reached. It is important to note that the sliding friction damping action varies proportionally as aforesaid and that the threshold amplitude likewise varies proportionally.

Where the system has relatively low frequency but high amplitude vibrational characteristics, a preferred material for the damping sleeve body 108 is Zytel 103HSL (nylon made by DuPont). Where Zytel is utilized as the material for the damping sleeve body 108 the damping action provided is essentially all sliding friction damping with the amount of solid damping by internal displacement being relatively insignificant. Alternatively, it may be considered that there is some sequential solid damping action provided but with a threshold amplitude very close to zero. Since the operation with the elastomeric urethane material includes both the same type of operation as the Zytel material plus another type of operation in sequence therebefore, a description of the operation with urethane should suffice to give an understanding of both.

Where the system has both high frequency and high amplitude vibrational characteristics, the Zytel material is preferred over the elastomeric urethane material, although the provision of other damping means within the system sufficient to reduce either the frequency or amplitudes may be in order. For example, it may be desirable to utilize a pulley having an elastomeric hub either on the main engine drive shaft or the compressor shaft or both.

As best shown in FIG. 4, the pivoted structure 40 includes a cylindrical interior peripheral surface 110 which extends axially therethrough and defines the interior of the cylindrical mounting portion 90. Damping sleeve body 108 has an exterior peripheral surface 112 of a size to enable the sleeve body to fit loosely within the pivoted structure surface 110. The damping sleeve body includes an interior peripheral surface 114 which closely engages the exterior peripheral surface of the core member 48. One end of the damping sleeve body 108 engages the inner surface of the end wall 60 of the housing part 50, while the opposite end thereof engages a washer 116 which also seats against the adjacent surface of the pivoted structure 40 and the inner surface of the end wall 70 of the housing part 52. Preferably, the washer is of material similar to the bearing member 92 as, for example, Zytel 101 ®.

In assembling the components of the belt tensioner 26 into their operative relationship with respect to one another, it will be noted that the core member 48 with the damping body 108 mounted thereon is fixed with respect to the shell part 50 by pressing the end portion 58 of the core member 48 into the correspondingly shaped opening 62 in the end wall 60 of the shell part 50. The annular member 92 which forms the bearing for the coil spring 44 is placed in engagement with the interior surface of the end wall 60. Spring 44 is then fed into the shell part 60 in eccentric relation so that the end 104 thereof can be engaged into the axially inner end portion of the slot 106. The cylindrical mounting portion 90 of the pivoted structure 40 is then moved axially into a position between the exterior periphery of the damping body 108 and the interior periphery of the annular member 92 until the end 86 of the spring is in engaged relation with the overhanging stop portion 88. The pivoted structure 40 is then pivoted in a counter-clockwise direction, as viewed in FIG. 1, which serves to torsionally stress the spring 44 between the ends 104 and 86 thereof. The application of this stress tends to move the spring end 104 in a counter-clockwise direction as viewed in FIG. 1, which movement by virtue of the 45° angle of the slot 106 tends to move the spring end 104 axially in a direction toward the rib 102. The nylon material from which the annular member 92 is made is sufficiently soft to deform in response to the axial movement of the spring end 104 in engagement therewith as is clearly shown in FIG. 3. This deformation of the rib 102 serves to fixedly secure the annular member 92 with the spring end against rotational movement about the axis of the core member 48. However, the arrangement enables the member 92 to move in a transverse direction with respect to the axis of the core member.

It will be noted that after the pivoted structure 40 has been moved into a position between the first and second positions thereof, the shell part 50 can then be engaged on the opposite end 58 of the core member 48, as by a press fit. Once this interconnection has been made (after suitably mounting thrust washer 116 in place) release of the pivoted structure 40 will result in the spring biased movement thereof into its second limiting position wherein the arm portion 78 engages one end of the peripheral wall 74 of the shell part 70. It will be understood that the position of the opening or slot 106 can be varied to vary the spring pressure applied by the spring 44. The assembly of the components is such that the spring 44 applies very little, if any, axial pressure on the pivoted structure 40 and the thrust washer 116, although an increased amount of axial pressure may be provided if desired.

The belt tensioner 26 is mounted by inserting the tab 64 within the opening 66 in the mounting bracket 38 and the bolt assembly 56 through the central opening 54 of the core member and the associated opening in the mounting bracket 38. The mounting of the belt tensioner to the bracket 38 in the manner indicated above serves to fix the fixed structure 36 of the belt tensioner 26 with respect to the engine of the vehicle. The pulley 42 rotatably mounted on the end of the pivoted structure 40 is then moved into operative engagement with the belt 12 by manually effecting a counter-clockwise movement as viewed in FIG. 1 of the pivoted structure 40 of the belt tensioner 26 with respect to the fixed structure 36 thereof. To assist in this movement a square opening 118 is formed in the center of the arm portion 78 for receiving a suitable lever type tool which may be utilized to provide the user with greater leverage through which to effect the turning movement. The pivoted structure is thus moved manually from its second minimum stressed limiting position, as shown in dotted lines in FIG. 1, to its first fully stressed limiting position, and after the belt has been engaged with the pulley 42, the pivoted structure is manually released and allowed to move under the bias of the spring 44 into tensioned engagement with the belt.

It will be noted that the arrangement is such that the belt load is transmitted to the pulley in a direction with respect to the axis of the pulley corresponding generally to the bisector of the angle of wrap of the belt with respect to the periphery of the pulley. The belt load is transmitted to the end 80 of the pivoted structure 40, is in turn transmitted by the arm portion 78 to the core member 48 of the fixed structure in a generally parallel direction with respect to the axis of the core member. It will also be noted that the torsional stressing of the ends 104 and 86 of the coil spring 44 establishes within the volutes of the spring a radial spring force component which acts generally in a radial direction bisecting the angle included between the two spring ends. This radial spring force component preferably acts in a direction generally the same as the direction in which the belt load is transmitted to the core member. Moreover, it will be noted that the belt load force is transmitted at a position adjacent the outer axial end of the core member by virtue of the position of the arm portion 78. The radial spring force component is transmitted by the spring to the opposite end of the core member by virtue of the provision of the relatively short axial peripheral surface 98 of the spring bearing member 92 which serves as the sole means for transmitting the radial spring force component to the core member through the mounting portion 90 of the pivoted structure 40 and the damping body 108. While the direction of application of the radial component of the spring force will vary as the position of the pivoted structure is varied, it acts generally in the same direction as the belt load. In the preferred embodiment herein described, the spring force direction is exactly aligned with the belt load direction when the pivoted structure has moved approximately ⅓ of the distance from its first position to its second position.

The generally balanced application of the radial component forces to the core member through the damping member in the manner indicated above is important in maintaining the pivoted structure 40 against axial misalignment as well as angular misalignment with respect to the fixed axis of the core member 48. Moreover, it will be noted that the magnitude of the radial forces acting on the fixed core member 48 radially through the damping body 108 are a maximum when the pivoted structure is in its first fully stressed position and progressively decreases as the pivoted structure is moved away from the first position toward its second belt takeup limiting position. The manner in which this decrease in the torsional spring pressure acting on the pivoted structure serves to provide a constant belt tensioning force is well known in the art. Briefly, the decrease in the spring pressure is compensated for by the variation in the moment arm of the belt tensioner as previously indicated. The radial force component of the spring likewise varies proportionally to the torsional force thereof so that the portion of the damping body 108 between the mounting portion 90 of the pivoted structure 40 and the core member 48 of the fixed structure 36 through which the radial forces are acting will be compressed a maximum amount when the pivoted structure 40 is in its first position with such compression decreasing progressively as the pivoted structure 40 moves away from its first position toward its second position.

The damping body 108 in its preferred form has a relatively tight fit at its inner periphery with the outer periphery of the core member 48, (this fit may be loose where the body 108 is made of Zytel) and a relatively loose fit (e.g., .001 to .005" clearance) between its exterior periphery and the interior periphery of the mounting portion 90 of the pivoted structure. Consequently, pivotal movement of the pivot structure 40 with respect to the fixed structure 36 between its limiting positions is basically accommodated by a sliding movement between the exterior periphery of the damping body and the inner periphery of the mounting portion 90. Moreover, it can be seen that since the radial pressure between these two contacting surfaces varies in accordance with the position of the pivoted structure 40 with respect to the fixed structure 36, the amount of friction between the two contacting surfaces will likewise vary and hence the torsional force required to overcome the frictional force will likewise vary. Furthermore, the durometer of the elastomeric material of the body 108 is such that relative rotational movement between the pivoted structure 40 and the fixed structure 36 is accommodated by internal elastomeric material displacement or shear until such time as the torsional force transmitted between the stress contacting surfaces of the mounting portion 90 and damping body reach a magnitude sufficient to overcome the frictional force, as indicated above.

In this way, imbalance forces in the system during normal operation imparted by the belt to the pulley 42 of a relatively low normal amplitude are accommodated by material displacement of the elastomeric material of the body 108 without any relative sliding movement between the stressed contacting surfaces of the mounting portion 90 and the elastomeric body 108. Such normal low amplitude movements are necessarily of short duration and hence in the normal operation of the belt tensioner 26 damping is provided without the necessity of surface-to-surface sliding movement. Where abnormal high amplitude movements beyond those accommodated by the elastomeric material displacement are encountered, a relative sliding movement between the stressed contacting surfaces of the mounting portion 90 and damping body 108 will occur, thus providing a sequential damping force suitable to prevent resonance at such abnormal high amplitudes of vibration. This high friction surface-to-surface sliding movement will likewise occur to accommodate the manual movement of the pivoted structure 40 from its second limiting position during the initial mounting of the belt tensioner 26 in operative relation with the belt. Moreover, the arrangement is such that the vibrational environment of the engine tends to cause the damping body 108 to assume a torsionally unstressed condition between the core member 48 and mounting portion 90 of the pivoted structure 40. In this way the different positions of operation which the pivoted structure 40 assumes over an extended period of use by virtue of the belt wear and extension are readily accommodated. Moreover, it will be noted that as the normal operating position of the pivoted structure 40 moves more toward the maximum takeup second limiting position with the attendant diminishing of the torsional spring effect, there is a proportional diminishing of the force required to overcome the friction between the stress contacting surfaces of the mounting portion 90 and damping body 108. This enables the amount of damping provided to be porportional to the amount required and insures effective damped operation throughout the entire operating range of movement of the belt tensioner throughout the life of the system. By proportioning the damping provided to that which is required, the extremes of too little damping at the high spring stress positions to the extent of allowing resonance or too much damping at the low spring stress positions to the extent of pulley hang-up are avoided throughout the operative range.

While the present invention has been described in relation to the above preferred embodiment, it will be understood that various modifications may be made within the spirit and scope of the invention. First, it has already been mentioned that the damping body can be made out of other materials which do not have the sequential damping action provided by elastomeric material but substantially only the sliding friction type damping action. In addition, it will be noted that since the spring 44 applies a degree of axial spring pressure to the thrust washer 116, the relative sliding movement which takes place between the stressed contacting surfaces of the pivoted structure 40 and thrust washer 116 provides a limited amount of damping. If desired a greater amount of damping may be provided by the thrust washer through the expedient of changing the material thereof to one which has a greater coefficient of friction. For example, the thrust washer could be made of elastomeric material. In general, it can be stated, however, that it is less desirable to provide damping by transmitting an axial force through a damping body than a radial force. Axial force transmission tends to cause axial misalignment between the pulley and belt and tends to be less controlled by virtue of the wedging action which usually takes place. For this reason, providing damping by virtue of a damping body which is stressed radially in the manner described above is preferred, although axial stressing or a combination of radial and axial stressing may be employed.

It will also be understood that while the damping provided by the friction surface sliding action is described as occurring only between the mounting portion 90 and damping body 108, such action could also be provided between the damping body and the core member as well. Indeed, the entire damping effect could be achieved by the sliding of these surfaces if desired, although it is preferable to utilize the surfaces of the body which are radially outermost because of the favorable torque arm provided thereby. In the elastomeric embodiment described this result is achieved by making the fit between the damping body and the core member tight while the fit with the mounting portion is loose. It will be understood that the tight fit could be glued or otherwise made immovable.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a belt tensioning device comprising
   a fixed structure,
   a pivoted structure mounted with respect to said fixed structure for pivotal movement about a first axis between first and second limiting positions,
   a belt engaging pulley rotatably carried by said pivoted structure for rotational movement about a second axis parallel with said first axis,
   spring means of rigid material acting between said fixed and pivoted structures for resiliently biasing said pivoted structure to move in a direction away from said first limiting position toward said second limiting position with a spring force which decreases as said pivoted structure is moved in a direction away from said first position toward said second position, and
   damping means for (1) damping by elastomeric material displacement normal low amplitude operating movements of said pivoted structure and (2) damping sequentially by high friction surface sliding abnormal high amplitude movements of said pivoted structure beyond those which are damped by the elastomeric material displacement with a damping force which decreases as said pivoted structure is moved in a direction away from said first position toward said second position.

2. A belt tensioner as defined in claim 1 wherein said fixed structure includes a core member extending axially along the first axis, said pivoted structure including a tubular portion disposed in surrounding relation with said core member so as to define therewith an annular space, said damping means including a body in said annular space.

3. A belt tensioner as defined in claim 2 wherein said body is formed of elastomeric polyurethane.

4. A belt tensioner as defined in claim 3 wherein said elastomeric polyurethane has a durometer of approximately 90.

5. In a belt tensioning device comprising a fixed structure, a pivoted structure mounted with respect to said fixed structure for pivotal movement about a first axis between first and second limiting positions, a belt engaging pulley rotatably carried by said pivoted structure for rotational movement about a second axis parallel with said first axis, spring means of rigid material acting between said fixed and pivoted structures for resiliently biasing said pivoted structure to move in a direction away from said first limiting position toward said second limiting position with a spring force which decreases as said pivoted structure is moved in a direction away from said first position toward said second position, and damping means for damping by friction surface sliding substantially all movements of said pivoted structure with a damping force which decreases as said pivoted structure is moved in a direction away from said first position toward said second position.

6. A belt tensioner as defined in claim 5 wherein said fixed structure includes a core member extending axially along the first axis, said pivoted structure including a tubular portion disposed in surrounding relation with said core member so as to define therewith an annular space, said damping means including a body in said annular space.

7. A belt tensioner as defined in claim 6 wherein said body is formed of Zytel.

8. A belt tensioner as defined in claim 2, 3, 4, 6 or 7 wherein said spring means includes a torsional coil spring disposed in surrounding relation to the tubular portion of said pivoted structure, said pivoted structure including an arm portion extending outwardly from one end of said tubular portion to which an adjacent end of said coil spring is operatively connected, means for operatively connecting the opposite end of said coil spring to said rigid structure so that said coil spring is decreasingly torsionally flexed between its ends in a manner tending to bias the volutes therebetween in a radial direction with a proportionally decreasing radial force component as said pivoted structure is moved from its first position toward its second position, and means acting between the ends of said coil spring for transmitting the aforesaid radial force component thereof through said tubular portion and said body to said core member so as to compress a portion of the body between contacting surfaces of said tubular portion and said core member with a radial component spring force which is proportional to the torsional flexure force of said spring and hence to the relative position of pivotal movement of said pivoted structure with respect to said fixed structure so that the tortional force required to effect a sliding movement between said body portion and a contact surface decreases as said pivoted structure is moved in a direction away from said first position toward said second position.

9. A belt tensioner as defined in claim 8 wherein said radial component force transmitting means includes an annular member rotatably mounted on the tubular portion of said pivoted structure having a relatively short axial portion disposed within a volute of said coil adjacent the aforesaid opposite end thereof so that the radial component force is transmitted from said spring to said relatively short portion.

10. A belt tensioner as defined in claim 9 wherein the direction through which the radial component force of said spring is transmitted to said core member in relation to said first axis is generally the same as the direction through which the belt load force on the pivoted structure is transmitted to said core member in relation to said first axis.

11. A belt tensioner as defined in claim 10 wherein said annular member includes a radially outwardly extending flange adjacent said relatively short axial portion, said flange having an annular rib projecting therefrom in an axial direction toward said relatively short axial portion, said fixed structure including a housing shell part fixed to the adjacent end of said core member and including a peripheral wall surrounding the relatively short axial portion and flange of said annular member, said connecting means for the opposite end of said coil spring including an opening in said peripheral wall receiving therein a radially outwardly projecting opposite end portion of said coil, said opening extending axially sufficient to initially receive said outwardly projecting spring end portion axially inwardly of said rib and having a radial extent such as to move said projecting spring end portion from the initially received position axially into deforming engagement with said rib in response to the operative torsional flexure thereof.

12. A belt tensioner as defined in claim 11 wherein said fixed structure includes a second housing shell part including an end wall fixed to said core member at said one end thereof and a segmental peripheral wall extending axially from the periphery thereof into engagement with the peripheral wall of said first mentioned housing shell part.

13. A belt tensioner as defined in claim 12 wherein the interior surface of the end wall of said second housing shell part has one surface of a thrust washer engaged therewith, the other surface of which engages a parallel annular surface on said pivoted structure.

14. A belt tensioner as defined in claim 13 wherein said thrust washer is formed of a synthetic resin.

15. A belt tensioner as defined in claim 14 wherein said resin is nylon.

16. A belt tensioner as defined in claim 9 wherein said annular member includes a radially outwardly extending flange adjacent said relatively short axial portion, said flange having an annular rib projecting therefrom in an axial direction toward said relatively short axial portion, said fixed structure including a housing shell part fixed to the adjacent end of said core member and including a peripheral wall surrounding the relatively short axial portion and flange of said annular member, said connecting means for the opposite end of said coil spring including an opening in said peripheral wall receiving therein a radially outwardly projecting opposite end portion of said coil, said opening extending axially sufficient to initially receive said outwardly projecting spring end portion axially inwardly of said rib and having a radial extent such as to move said projecting spring end portion from the initially received position axially into deforming engagement with said rib in response to the operative torsional flexure thereof.

17. A belt tensioner as defined in claim 16 wherein said fixed structure includes a second housing shell part including an end wall fixed to said core member at said one end thereof and a segmental peripheral wall extending axially from the periphery thereof into engagement with the peripheral wall of said first mentioned housing shell part.

18. A belt tensioner as defined in claim 17 wherein the interior surface of the end wall of said second housing shell part has one surface of a thrust washer engaged therewith, the other surface of which engages a parallel annular surface on said pivoted structure.

19. A belt tensioner as defined in claim 18 wherein said thrust washer is formed of a synthetic resin.

20. A belt tensioner as defined in claim 19 wherein said resin is nylon.

* * * * *

UNITED STATES PATENT AND TRADEMARK OFFICE
CERTIFICATE OF CORRECTION

PATENT NO. : B1 4,473,362

DATED : July 9, 1991

INVENTOR(S) : Henry W. Thomey, Klaus K. Bytzek and Johannes H. Mevissen

It is certified that error appears in the above-identified patent and that said Letters Patent is hereby corrected as shown below:

Column 2, line 5 of new claim 21, delete "axially balance the" and insert --generally maintain the pivoted structure against axial misalignment with respect to the first axis when taken in conjunction with the direction of a--.

Signed and Sealed this

Twenty-fourth Day of December, 1991

Attest:

HARRY F. MANBECK, JR.

Attesting Officer

Commissioner of Patents and Trademarks

REEXAMINATION CERTIFICATE (1504th)
United States Patent [19]
Thomey et al.

[11] B1 4,473,362
[45] Certificate Issued Jul. 9, 1991

[54] BELT TENSIONER WITH VARIABLY PROPORTIONAL DAMPING

[75] Inventors: Henry W. Thomey, Keswick; Klaus K. Bytzek; Johannes H. Mevissen, both of Schomberg, all of Canada

[73] Assignee: Litens Automotive Inc., Ontario, Canada

Reexamination Request:
No. 90/001,853, Sep. 29, 1989

Reexamination Certificate for:
Patent No.: 4,473,362
Issued: Sep. 25, 1984
Appl. No.: 281,501
Filed: Jul. 8, 1981

[51] Int. Cl.$^5$ .............................................. F16H 7/12
[52] U.S. Cl. .................................... 474/135; 474/115; 474/133; 474/136
[58] Field of Search ............... 474/101, 109, 111, 113, 474/115, 133, 135, 136, 138; 188/379; 267/134, 136, 152

[56] References Cited

U.S. PATENT DOCUMENTS

| | | | |
|---|---|---|---|
| 1,667,117 | 4/1928 | Ireland | 474/133 X |
| 3,834,246 | 9/1974 | McGlip | 474/135 |
| 3,924,483 | 12/1975 | Walker . | |
| 3,975,965 | 8/1976 | Speer . | |
| 4,270,906 | 6/1981 | Kraft . | |
| 4,276,038 | 6/1981 | Kraft . | |
| 4,277,240 | 7/1981 | Kraft . | |
| 4,283,181 | 8/1981 | Sproul . | |
| 4,283,182 | 8/1981 | Kraft . | |
| 4,285,676 | 8/1981 | Kraft . | |
| 4,299,583 | 11/1981 | Kraft . | |
| 4,299,584 | 11/1981 | Sproul . | |
| 4,309,174 | 1/1982 | Sproul . | |
| 4,362,525 | 12/1982 | Sproul . | |
| 4,392,840 | 7/1983 | Radocaj . | |
| 4,402,677 | 9/1983 | Radocaj . | |
| 4,411,638 | 10/1983 | Wilson . | |
| 4,413,982 | 11/1983 | Foster . | |
| 4,416,647 | 11/1983 | White . | |
| 4,416,648 | 11/1983 | Radocaj . | |
| 4,454,236 | 6/1984 | Foster . | |
| 4,464,147 | 8/1984 | Foster . | |
| 4,466,803 | 8/1984 | Wilson . | |
| 4,509,935 | 4/1985 | Foster . | |
| 4,696,664 | 9/1987 | Wilson . | |
| 4,728,317 | 3/1988 | Martz et al. . | |

FOREIGN PATENT DOCUMENTS
54-172165 12/1979 Japan .

OTHER PUBLICATIONS

Parts Catalog Revision No. 21, International Harvester Co., Sep. '73, pp: cover, I, II, Index 30-38, '86-'89.
International Harvester Co. (alias MTD Products Inc.) drawing, Arm Assy, Ider, 3-26-66.
International Harvester Co. (alias MTD Products Inc.) drawing, Spring Idler Torsion, 9-22-66.
International Harvester Co. (alias MTD Products Inc.) drawing, bolt, Idler Arm Pivot.
SAE Technical Paper Series 790699, Extended Life Accessory Drive, Jun. 11-15, 1979.

*Primary Examiner*—Thuy M. Bui

[57] ABSTRACT

In a belt tensioning device of the type including a fixed structure, a pivoted structure mounted with respect to the fixed structure for pivotal movement about a first axis between first and second limiting positions, a belt engaging pulley rotatably carried by the pivoted structure for rotational movement about a second axis parallel with the first axis and a torsional coil spring acting between the fixed and pivoted structures for resiliently biasing the pivoted structure to move in a direction away from the first limiting position toward the second limiting position with a spring force which decreases as the pivoted structure is moved in a direction away from the first position toward the second position. The device is provided either with an elastomeric damping body for (1) damping by elastomeric material displacement normal low amplitude operating movements of the pivoted structure and (2) damping sequentially by high friction surface sliding abnormal high amplitude movements of the pivoted structure beyond those which are damped by the elastomeric material displacement with a damping force which decreases as the pivoted structure is moved in a direction away from the first position toward the second position or a Zytel damping body for damping by friction surface sliding substantially all movements of said pivoted structure with a damping force which decreases as the pivoted structure is moved in a direction away from the first position toward the second position.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-20 is confirmed.

New claim 21 is added and determined to be patentable.

*21. A belt tensioner as defined in claim 5 wherein said damping force is transmitted between said pivoted structure and said fixed structure in a direction tending to axially balance the force created by the belt tension on said pulley transmitted between said pivoted structure and said fixed structure.*

* * * * *